(12) United States Patent
Ogata et al.

(10) Patent No.: US 12,533,048 B2
(45) Date of Patent: Jan. 27, 2026

(54) ORAL CAVITY ATTACHMENT TOOL AND HALITOSIS MEASUREMENT SYSTEM

(71) Applicant: I-PEX Inc., Kyoto (JP)

(72) Inventors: Kenji Ogata, Ogori (JP); Reiji Konishi, Machida (JP); Ayako Sato, Machida (JP)

(73) Assignee: I-PEX Inc., Kyoto (JP)

( * ) Notice: Subject to any disclaimer, the term of this patent is extended or adjusted under 35 U.S.C. 154(b) by 389 days.

(21) Appl. No.: 18/018,824

(22) PCT Filed: Jun. 25, 2021

(86) PCT No.: PCT/JP2021/024060
§ 371 (c)(1),
(2) Date: Jan. 30, 2023

(87) PCT Pub. No.: WO2022/024621
PCT Pub. Date: Feb. 3, 2022

(65) Prior Publication Data
US 2023/0301548 A1    Sep. 28, 2023

(30) Foreign Application Priority Data

Jul. 31, 2020 (JP) .................................. 2020-130580

(51) Int. Cl.
*A61B 5/097* (2006.01)
*A61B 5/00* (2006.01)
*A61B 5/08* (2006.01)

(52) U.S. Cl.
CPC .............. *A61B 5/097* (2013.01); *A61B 5/082* (2013.01); *A61B 5/682* (2013.01)

(58) Field of Classification Search
None
See application file for complete search history.

(56) References Cited

U.S. PATENT DOCUMENTS

2005/0210612 A1    9/2005    Hohlbein et al.
2007/0009856 A1    1/2007    Jones et al.
(Continued)

FOREIGN PATENT DOCUMENTS

CH         707875 A1      10/2014
JP     H02-98337 A        4/1990
(Continued)

OTHER PUBLICATIONS

Chinese Office Action dated Jun. 9, 2025, issued for the corresponding CN patent application No. 202180060361.3 and the English translation, 14 pages.

*Primary Examiner* — Jay B Shah
(74) *Attorney, Agent, or Firm* — Howard & Howard Attorneys PLLC

(57) ABSTRACT

A mouth cavity attachment tool (1A) is attachable to a mouth cavity (M) of a person (P) under examination. The mouth cavity attachment tool (1A) includes a partitioning portion (10A) and a gap forming portion (11A). The partitioning portion (10A) partitions a mouth cavity (M) into a first portion (M1) where objects of measurement of halitosis are located and a second portion (M2) communicating with a pharynx (6) of the person (P) under examination. The gap forming portion (11A) is connected to the partitioning portion (10A) and forms gaps (G) in spaces to the objects of measurement. Since the mouth cavity attachment tool (1A) includes the partitioning portion (10A) partitioning the mouth cavity (M) into a first portion (M1) where tooth rows (2) and gums (3) are located and a second portion (M2) communicating with the pharynx (6) of the person (P) under examination, halitosis can be detected accurately.

15 Claims, 21 Drawing Sheets

(56) References Cited

U.S. PATENT DOCUMENTS

| | | |
|---|---|---|
| 2010/0151407 A1 | 6/2010 | Rizoiu et al. |
| 2012/0021375 A1 | 1/2012 | Binner et al. |
| 2016/0054295 A1 | 2/2016 | Grisel et al. |
| 2016/0331356 A1 | 11/2016 | Binner et al. |
| 2017/0056143 A1 | 3/2017 | Hyun |
| 2019/0261889 A1* | 8/2019 | White .................... A61B 5/682 |
| 2020/0196994 A1 | 6/2020 | Fougere |

FOREIGN PATENT DOCUMENTS

| | | | |
|---|---|---|---|
| JP | 2002-286670 A | 10/2002 | |
| JP | 2009-502214 A | 1/2009 | |
| JP | 2013-541693 A | 11/2013 | |
| JP | 2017-506138 A | 3/2017 | |
| KR | 20190065678 A * | 6/2019 | ......... A61C 17/0208 |

* cited by examiner

ORAL CAVITY ATTACHMENT TOOL AND HALITOSIS MEASUREMENT SYSTEM

CROSS-REFERENCE TO RELATED APPLICATIONS

This application is a U.S. National Phase Application of International Patent Application No. PCT/JP2021/024060, filed Jun. 25, 2021, which claims the benefit of JP Patent Application No. 2020-130580, filed Jul. 31, 2020, the disclosures of which are hereby incorporated by reference in their entirety.

TECHNICAL FIELD

The present disclosure relates to a mouth cavity attachment tool and a halitosis measurement system.

BACKGROUND ART

In Patent Literature 1, a halitosis measurement device including a mouth air chamber that stores halitosis gas by sealing the oral region at the oral vestibule of a person under examination and thereby forming a space having a certain volume in the mouth cavity is disclosed. The halitosis measurement device measures halitosis using the stored gas.

CITATION LIST

Patent Literature

Patent Literature 1: Unexamined Japanese Patent Application Publication No. H02-98337

SUMMARY OF INVENTION

Technical Problem

However, in the halitosis measurement device disclosed in the above-described Patent Literature 1, a space in which the mouth air chamber stores halitosis gas communicates with the pharynx of the person under examination. Thus, exhaled air of the person under examination is likely to be contained in the stored halitosis gas. Since the exhaled air of the person under examination decreases concentration of odor substances that cause halitosis and are emitted in the mouth cavity, there is a possibility that the exhaled air decreases detection precision of halitosis originating in the mouth cavity.

The present disclosure has been made in consideration of the above-described situation, and an objective of the present disclosure is to provide a mouth cavity attachment tool and a halitosis measurement system capable of improving detection precision of halitosis originating in the mouth cavity.

Solution to Problem

In order to achieve the above-described objective, a mouth cavity attachment tool according to a first aspect of the present disclosure is a mouth cavity attachment tool that is attachable to a mouth cavity of a person under examination and includes: a partitioning portion to partition the mouth cavity into a portion in which an object of measurement of halitosis is located and a portion communicating with a pharynx of the person under examination; and a gap forming portion connected to the partitioning portion and configured to form a gap between the mouth cavity attachment tool and the object of measurement.

In this case, the mouth cavity attachment tool may be configured in such a way that the gap forming portion forms the gap by entering between the object of measurement and a region in the mouth cavity coming into contact with the object of measurement.

The mouth cavity attachment tool may be configured in such a way that on the gap forming portion, a recessed portion forming the gap is formed.

The mouth cavity attachment tool may include: a discharge pipe to discharge gas in contact with the object of measurement from the gap to an outside of the mouth cavity; and a feed portion to feed gas in the mouth cavity into the gap.

The mouth cavity attachment tool may include: a discharge pipe to discharge gas in contact with the object of measurement from the gap to an outside of the mouth cavity; and an internal flow path opening opposite to the object of measurement and forming the gap and also communicating with the discharge pipe.

The mouth cavity attachment tool may be configured in such a way that the mouth cavity attachment tool is formed of an elastic member, and is formed in such a way as not to close the internal flow path while the mouth cavity attachment tool is bitten by the person under examination.

The mouth cavity attachment tool may be configured in such a way that the gap forming portion is configured to be capable of sealing the gap when the mouth cavity attachment tool is taken out from the mouth cavity.

The mouth cavity attachment tool may be configured in such a way that the object of measurement includes at least one of a front side and a back side of a tooth row and a gum of the person under examination.

The mouth cavity attachment tool may be configured in such a way that the object of measurement includes a boundary portion between the tooth row and the gum.

In addition, a halitosis measurement system according to a second aspect of the present disclosure includes: the mouth cavity attachment tool according to the first aspect of the present disclosure; and an odor sensor to detect an odor substance, the odor substance being a component of halitosis, based on gas having been in contact with an object of measurement in the mouth cavity attachment tool.

The halitosis measurement system may include a pump to suck gas having been in contact with the object of measurement from the mouth cavity attachment tool and send the gas to the odor sensor.

The halitosis measurement system may be configured in such a way that the odor sensor is installed inside the mouth cavity attachment tool.

The halitosis measurement system may be configured in such a way that the pump and the odor sensor are installed inside the mouth cavity attachment tool.

The halitosis measurement system may be configured in such a way that the pump and the odor sensor are installed outside the mouth cavity.

In addition, a halitosis measurement system according to a third aspect of the present disclosure includes: the mouth cavity attachment tool according to the first aspect of the present disclosure; a pump to suck gas having been in contact with an object of measurement from the mouth cavity attachment tool; a collector to collect gas sucked by the pump; and an odor sensor to detect an odor substance, the odor substance being a component of halitosis, based on gas collected by the collector.

The halitosis measurement system may include an information generator to generate advice information for the person under examination, based on an odor substance detected by the odor sensor.

Advantageous Effects of Invention

According to the present disclosure, since the mouth cavity attachment tool of the present disclosure includes a partitioning portion that partitions the mouth cavity of a person under examination into a portion in which an object of measurement of halitosis is located and a portion that communicates with the pharynx, it is possible to improve detection precision of halitosis originating in the mouth cavity.

DESCRIPTION OF EMBODIMENTS

Figure 1A:
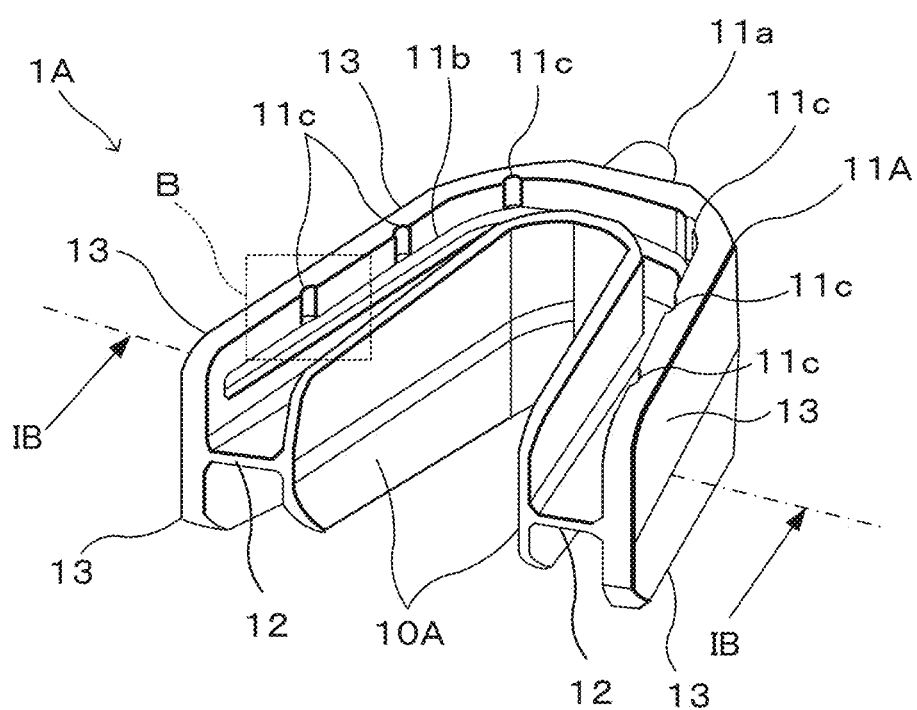
FIG. 1A is a perspective view of a mouth cavity attachment tool according to Embodiment 1 of the present disclosure.

Embodiments of the present disclosure are described below in detail with reference to the drawings. In the drawings, the same or equivalent constituent elements are designated by the same reference numerals.

Embodiment 1

First, Embodiment 1 of the present disclosure is described. First, a configuration of a mouth cavity attachment tool according to the present embodiment is described.

As illustrated in FIG. 1A, a mouth cavity attachment tool 1A according to the present embodiment is of a mouthpiece type and is U-shaped or V-shaped as a whole.

Figure 1B:
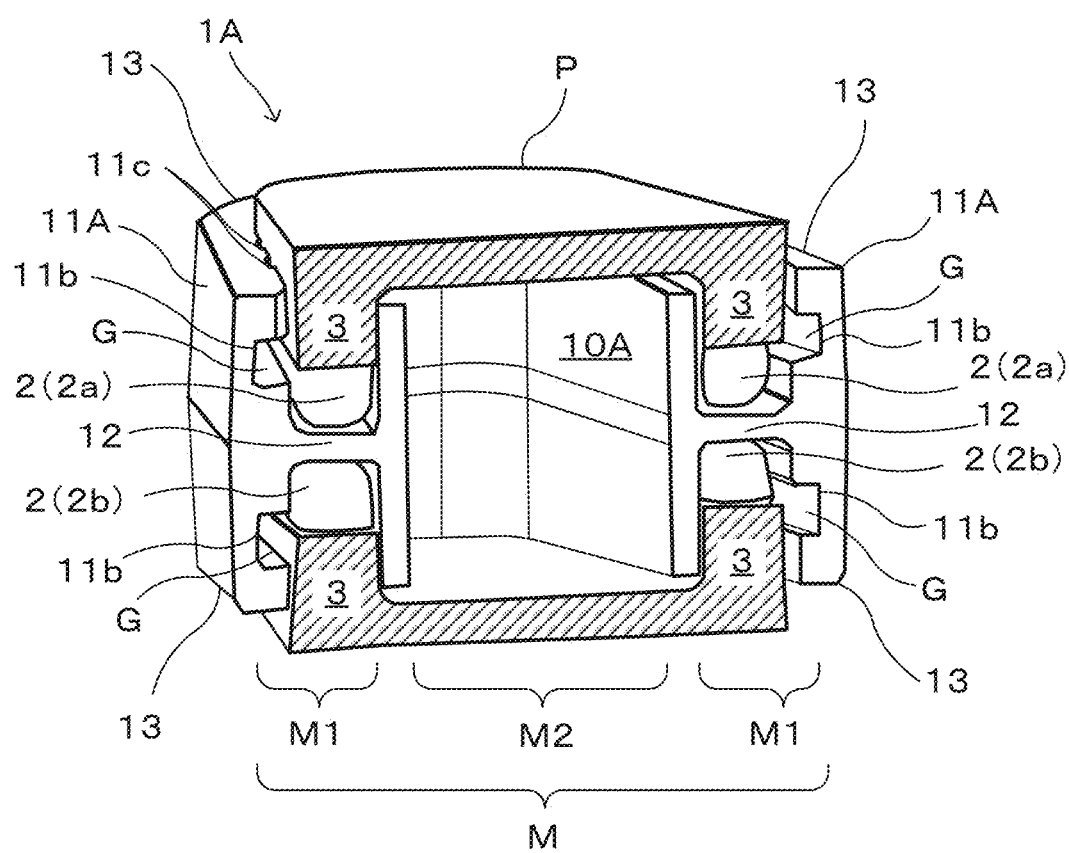
FIG. 1B is a cross-sectional perspective view taken along the line IB-IB of FIG. 1A in the case where the mouth cavity attachment tool in FIG. 1A is attached to the mouth cavity.
Figure 2:
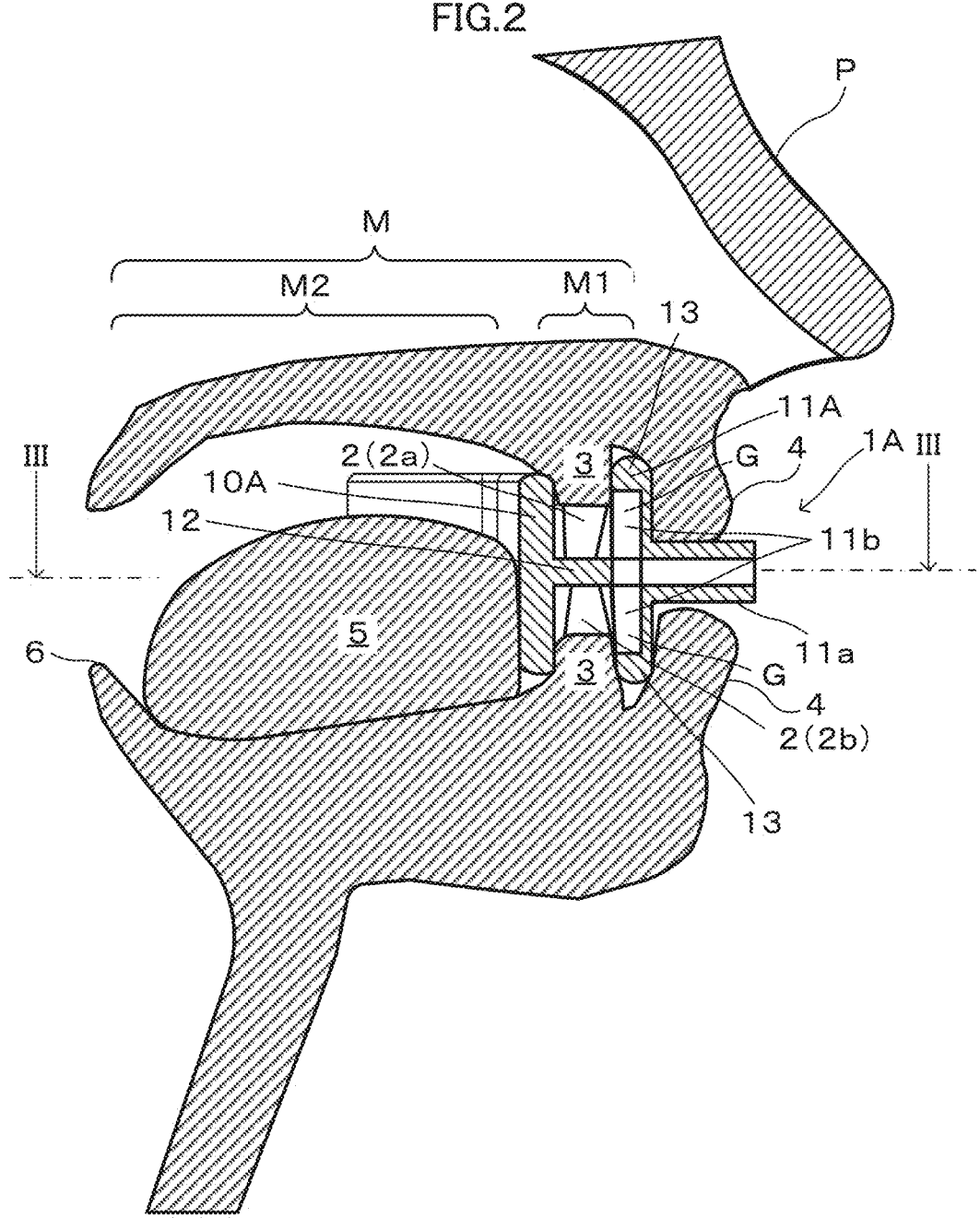
FIG. 2 is a cross-sectional view along a sagittal plane illustrating an appearance in which the mouth cavity attachment tool in FIG. 1A is attached to the mouth cavity of a person under examination.
Figure 3:
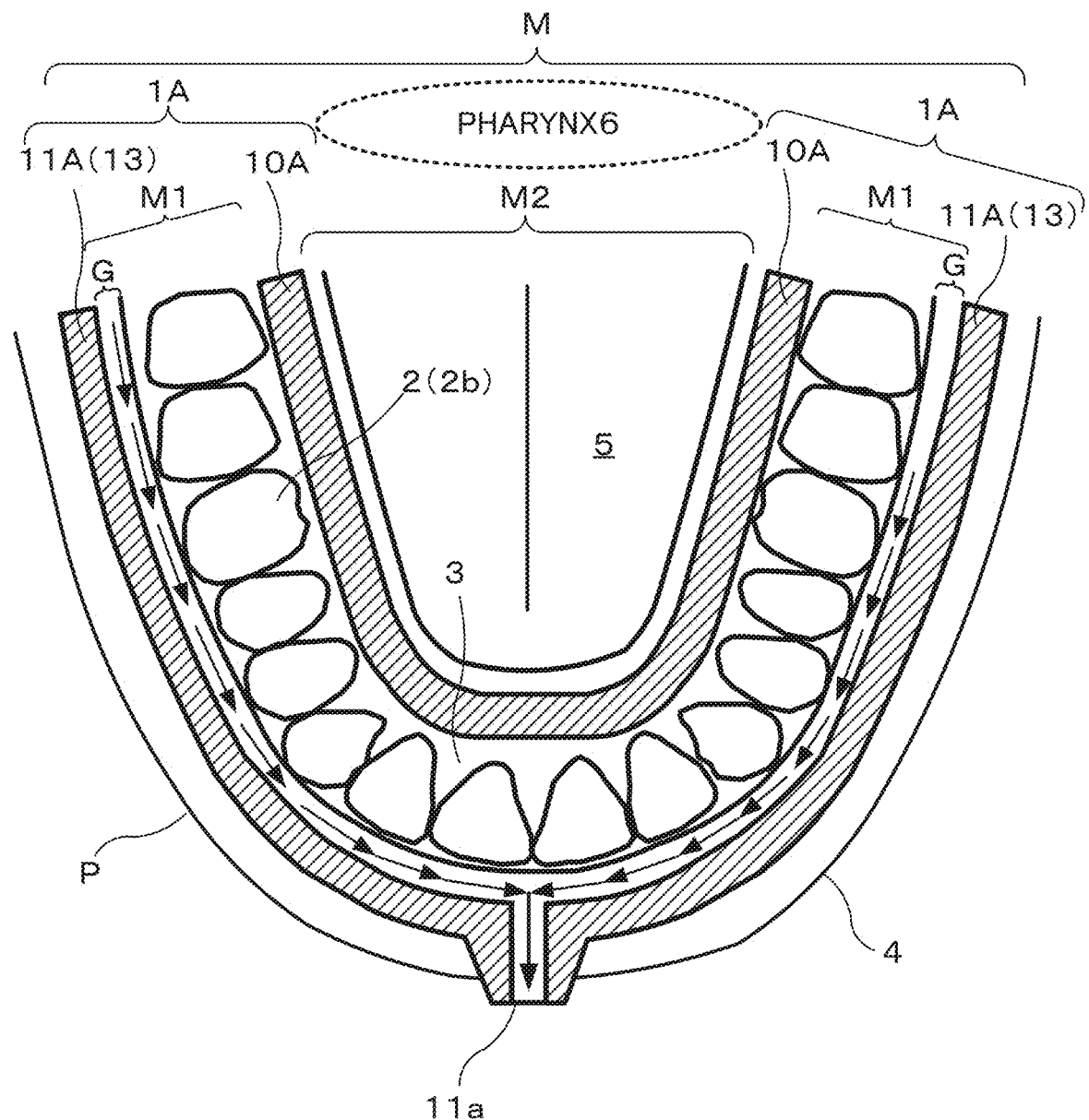
FIG. 3 is a horizontal cross-sectional view taken along the line III-III of FIG. 2.

As illustrated in FIG. 1B, FIG. 2, and FIG. 3, the mouth cavity attachment tool 1A can be attached to a mouth cavity M of a person P under examination to measure halitosis. In the present embodiment, it is assumed that the person P under examination is a person and objects of measurement of halitosis in the mouth cavity M are the front sides of tooth rows 2 and gums (gingivae) 3. The objects of measurement include boundary portions between the front sides of the tooth rows 2 and the front sides of the gums 3. The boundary portions are portions that are likely to cause halitosis due to, for example, development of periodontal disease. Herein, as illustrated in FIG. 2, it is assumed that, in the mouth cavity M, a side on which lips 4 of the person P under examination is located is the front side and a side on which a pharynx 6 of the person P under examination is located is the back side.

As illustrated in FIG. 1A, FIG. 2, and FIG. 3, the mouth cavity attachment tool 1A includes a partitioning portion 10A and a gap forming portion 11A. The mouth cavity attachment tool 1A is formed of an elastic member. Examples of such an elastic member include urethane rubber and silicone rubber.

As illustrated in FIG. 2, the partitioning portion 10A partitions the mouth cavity M into a first portion M1 in which the tooth rows 2 and the gums 3, which are objects of measurement of halitosis, are located and a second portion M2 that communicates with the pharynx 6 of the person P under examination. The gap forming portion 11A is connected to the partitioning portion 10A and, at the same time, forms gaps G on the front side of the tooth rows 2 and gums 3, which are the objects of measurement.

Gases existing in the gaps G are in contact with the boundary portions between the front sides of the tooth rows 2 and the front sides of the gums 3. The gap forming portion 11A has a discharge pipe 11a that communicates the gaps G with the outside of the mouth cavity M. The gases existing in the gaps G are taken out through the discharge pipe 11a as a sample containing odor substances that are components of halitosis.

Since the gaps G formed in the first portion M1 are isolated from the second portion M2 by the partitioning portion 10A, exhaled air of the person P under examination is less likely to enter the gaps G. Because of this configuration, flows of gases in the gaps G become slow, and odor substances emitted from the tooth rows 2 and the gums 3 are likely to be contained in the gases. Thus, the gases in the gaps G can be taken out through the discharge pipe 11a while concentrations of odor substances in the gases are kept high. Note that actual measurement is performed while the mouth of the person P under examination is closed. Closing the mouth brings the mouth cavity attachment tool 1A into a state in which only the discharge pipe 11a communicates with the outside of the mouth cavity M.

The configuration of the mouth cavity attachment tool 1A is described more in detail. As illustrated in FIG. 3, the partitioning portion 10A is located on the back side of the tooth rows 2 and gums 3 and bends along the tooth rows 2 and the gums 3. This configuration causes the first portion M1 to be a portion that is formed in an interspace between the gap forming portion 11A and the partitioning portion 10A and includes the tooth rows 2 and the gums 3 and the second portion M2 to be a portion in which a tongue 5 is located and that communicates with the pharynx 6.

The gap forming portion 11A has a clamped portion 12, as illustrated in FIG. 1A, FIG. 1B, and FIG. 2. The clamped portion 12 is connected to the partitioning portion 10A and projects to the lips 4 side, that is, the front side, from the partitioning portion 10A. As illustrated in FIG. 1B and FIG. 2, the clamped portion 12 is clamped between an upper tooth row 2a and a lower tooth row 2b of the person P under examination.

The gap forming portion 11A has a wall portion 13, as illustrated in FIG. 1A and FIG. 2. The wall portion 13 is connected to the clamped portion 12 and is arranged in such a manner as to face the partitioning portion 10A with the clamped portion 12 interposed therebetween. As illustrated in FIG. 3, the wall portion 13 is arranged on the front side of the tooth rows 2 and gums 3 and bends along the front side of the tooth rows 2 and gums 3. As illustrated in FIG. 2, the wall portion 13 enters between the tooth rows 2 and gums 3, which are objects of measurement, and the lips 4. The lips 4 corresponds to regions in the mouth cavity M that come into contact with the objects of measurement.

On the wall portion 13, recessed portions 11b that form the gaps G are formed, as illustrated in FIG. 1A and FIG. 1B. The recessed portions 11b are formed on surfaces that face the partitioning portion 10A, as illustrated in FIG. 1A. When the clamped portion 12 is clamped between the upper tooth row 2a and the lower tooth row 2b of the person P under examination, the recessed portions 11b respectively extend along the boundary portions between the outsides of the tooth rows 2 and the outsides of the gums 3. The recessed portions 11b cause the gaps G to be respectively formed between the mouth cavity attachment tool 1A and the boundary portions between the outsides of the tooth rows 2 and the outsides of the gums 3, as illustrated in FIG. 1B and FIG. 2. As described above, in the present embodiment, the gap forming portion 11A enters between the tooth rows 2 and gums 3 and the lips 4 and forms the gaps G by the recessed portions 11b.

To the gap forming portion 11A, the above-described discharge pipe 11a, which communicates the gaps G with the outside of the mouth cavity M as described above, is disposed. The discharge pipe 11a discharges gases in contact with the tooth rows 2 and the gums 3, which are the objects of measurement, from the gaps G to the outside of the mouth cavity M.

Figure 1C:
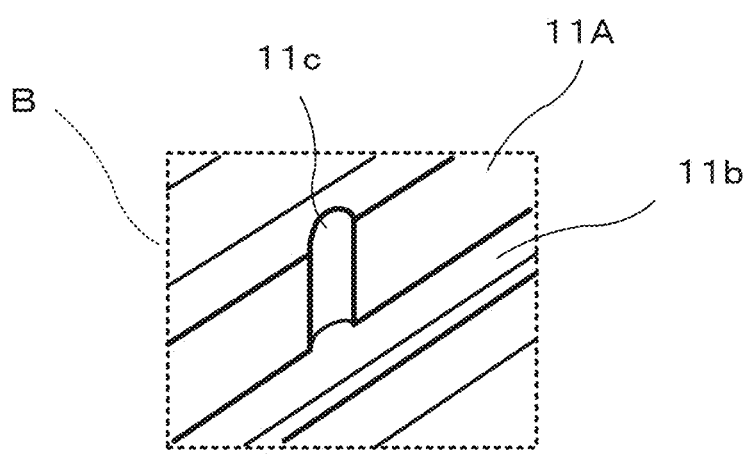
FIG. 1C is an enlarged view of a part B in FIG. 1A.

On the gap forming portion 11A, groove portions 11c that serve as feed portions are formed, as illustrated in FIG. 1C. The groove portions 11c communicate the gaps G formed by the recessed portions 11b with the outside (specifically, spaces between the gums 3 and the lips 4). When gases existing in the gaps G are discharged via the discharge pipe 11a, gas in the mouth cavity M is fed into the gaps G via the groove portions 11c. This gas feed prevents rapid decompression in the gaps G.

Figure 4:
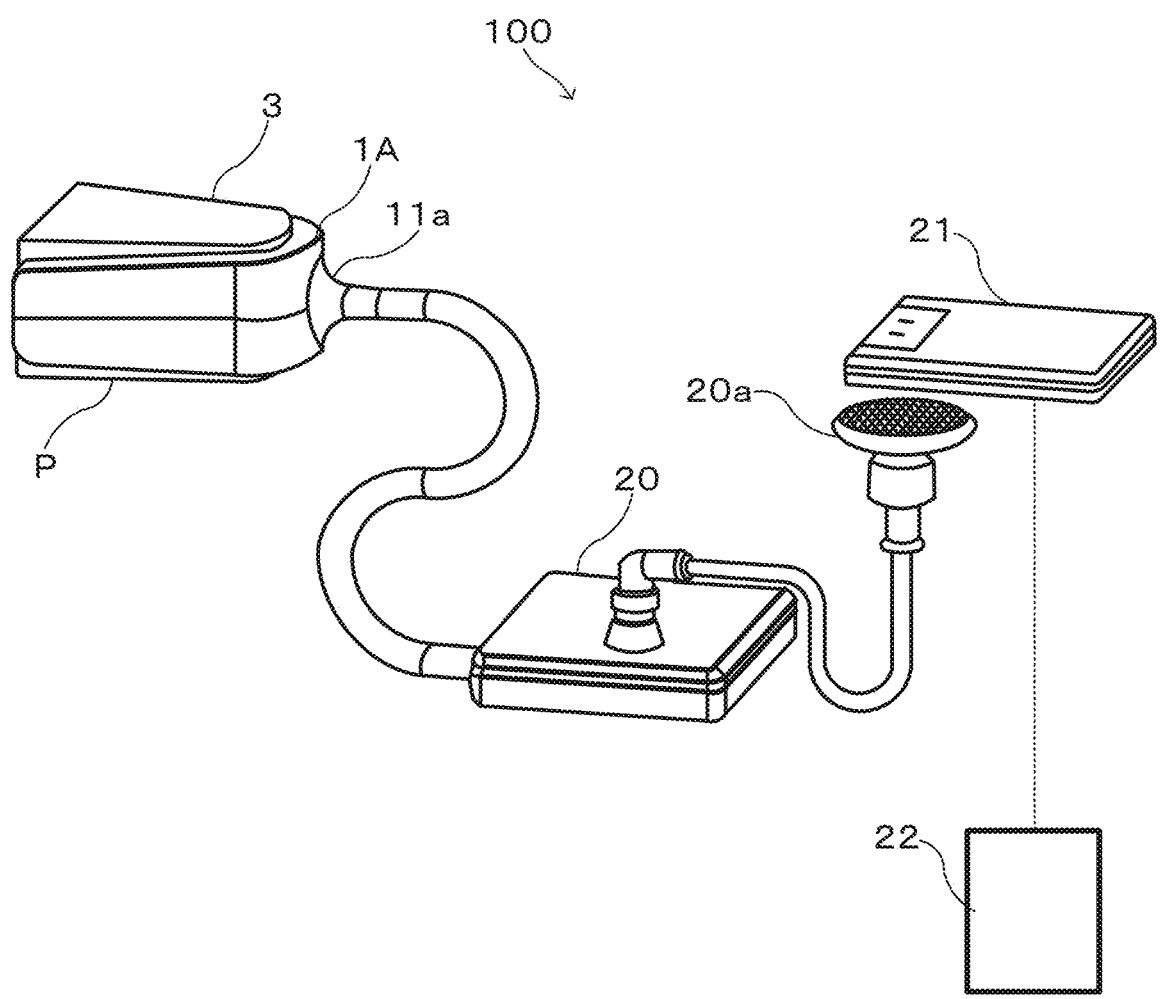
FIG. 4 is a schematic diagram illustrating a configuration of a halitosis measurement system according to Embodiment 1 of the present disclosure.

As illustrated in FIG. 4, a halitosis measurement system 100 includes, in addition to the mouth cavity attachment tool 1A, a pump 20, an odor sensor 21, and an information processing device 22 that serves as an information generator.

The pump 20 sucks gases that have been in contact with the objects of measurement from the mouth cavity attachment tool 1A. Suction force of the pump 20 is only required to be strong enough to be able to gently suck the gases in the gaps G. Specifically, the pump 20 is connected to the discharge pipe 11a of the mouth cavity attachment tool 1A and sucks gases that have been in contact with the tooth rows 2 and the gums 3 in the gaps G via the discharge pipe 11a. A nozzle 20a is connected to the pump 20, and the gases sucked by the pump 20 are discharged from the nozzle 20a.

The odor sensor 21 is arranged at a position at which the nozzle 20a discharges the gases sucked by the pump 20. The odor sensor 21 detects one or a plurality of odor substances that is components of halitosis, based on gas that is sucked by the pump 20 and discharged from the nozzle 20a. The detected odor substances are substances that serve as causative substances of halitosis, and examples of the odor substance include volatile sulfur compounds (VSC), such as hydrogen sulfide and methyl mercaptan. The odor sensor 21 is capable of detecting a plurality of different odor substances. The odor sensor 21 converts information about the detected odor substances (qualitative information and quantitative information) to electrical signals and outputs the converted electrical signals.

As described above, in the present embodiment, the pump 20 and the odor sensor 21 are arranged outside the mouth cavity M.

The information processing device 22 is an information processing terminal, such as a smartphone and a personal computer. The information processing device 22 includes a central processing unit (CPU), a read only memory (ROM), a random access memory (RAM), a hard disk, a man-machine interface such as a touch panel, an input/output interface, a communication interface, and the like as hardware resources. The information processing device 22 achieves functions thereof by the CPU executing software programs, that is, the hardware resources and software collaborating with each other.

The information processing device 22 generates advice information for the person P under examination, based on odor substances detected by the odor sensor 21 and outputs the generated advice information. As described above, a plurality of different odor substances is detected by the odor sensor 21. The information processing device 22 identifies an odor composed of a plurality of odor substances, based on a detection pattern of a plurality of detected odor substances. Further, the information processing device 22 classifies the type of odor, that is, whether the identified odor is the odor of eaten food or an odor caused by periodontal disease.

The advice information includes information about intensity of halitosis and countermeasures to reduce halitosis.

That is, the advice information is information that assists the person P under examination in such a manner that consulting the information enables the person P under examination to determine what action to be taken against halitosis. Examples of such advice information include "You don't have halitosis, and there is no problem. Keep practicing current toothbrushing and the like.", "Because your mouth is giving off a strong smell of garlic, you are advised to brush your teeth early.", and "You have the possibility of periodontal disease. You are advised to consult a dentist.".

Next, operation of the halitosis measurement system 100 according to the present embodiment, that is, a flow of measurement of halitosis, is described.

Figure 5:
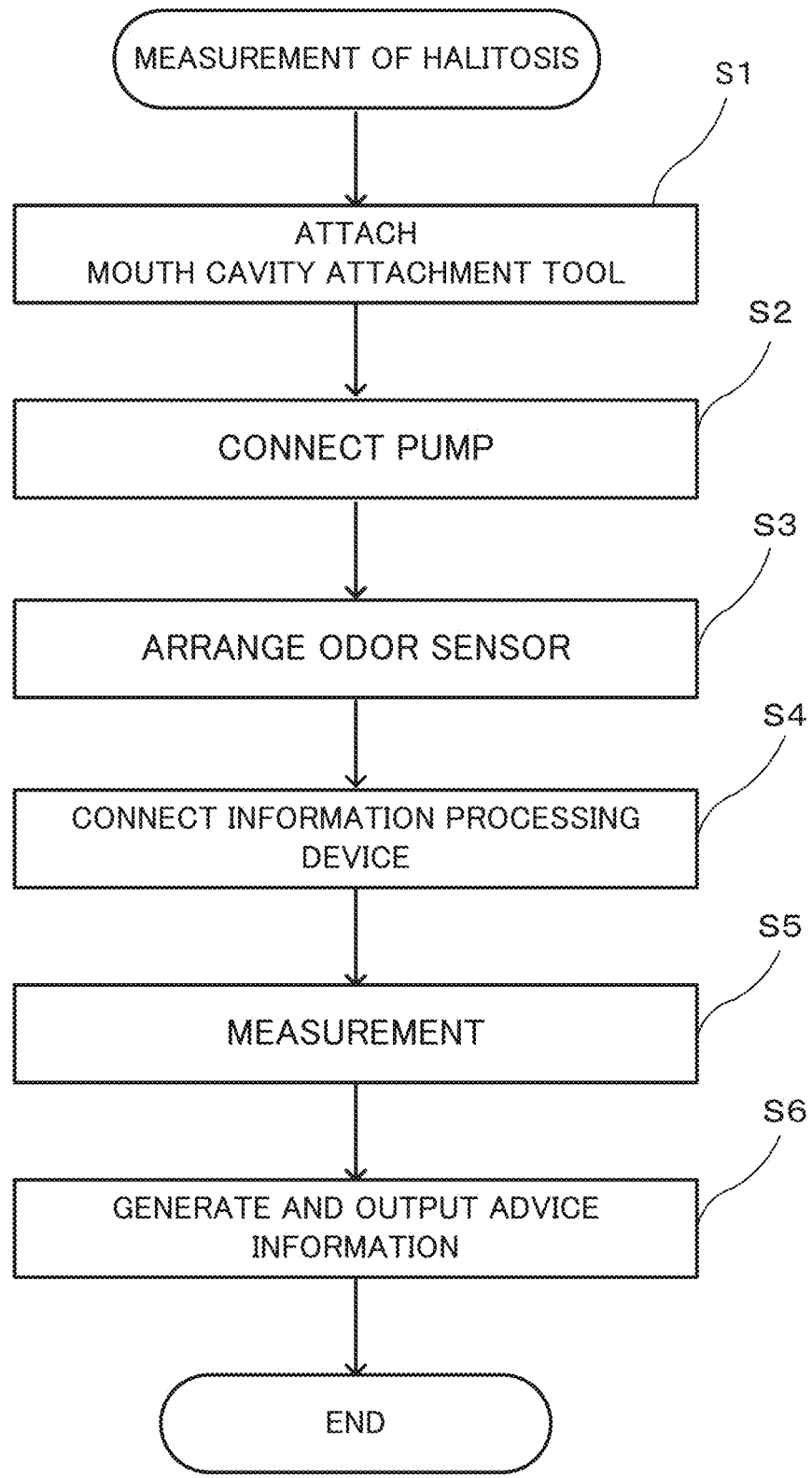
FIG. 5 is a flowchart illustrating a flow of measurement of halitosis using the halitosis measurement system in FIG. 4.

As illustrated in FIG. 5, first, the mouth cavity attachment tool 1A is attached in the mouth cavity M of the person P under examination (step S1). In this case, the person P under examination puts the mouth cavity attachment tool 1A, which includes the partitioning portion 10A and the gap forming portion 11A, in the mouth cavity M and bites the clamped portion 12 with the upper tooth row 2a and the lower tooth row 2b, as illustrated in FIG. 1B. An end of the discharge pipe 11a projects from between the upper and lower lips 4 to the outside of the mouth cavity M.

While the mouth cavity attachment tool 1A is in this state, the discharge pipe 11a of the mouth cavity attachment tool 1A and the pump 20 are connected to each other via a hose (step S2), the odor sensor 21 is arranged in such a manner as to be able to detect odor substances contained in gas to be discharged from the nozzle 20a of the pump 20 (step S3), and the odor sensor 21 and the information processing device 22 are connected to each other in a data communicable manner (step S4). The above-described steps S2, S3, and S4 may be performed in a different sequence from the above-described sequence.

While being in this state, the halitosis measurement system 100 performs measurement of halitosis (step S5). Note that, during the measurement, the person P under examination closes the lips 4 except the discharge pipe 11a. In the measurement, when the pump 20 is activated, gases are discharged from the gaps G of the mouth cavity attachment tool 1A via the discharge pipe 11a and are sent to the odor sensor 21, as illustrated by arrows in FIG. 3. The odor sensor 21 detects odor contained in the sent gas. A detection result of odor substances by the odor sensor 21 is sent to the information processing device 22.

Next, the information processing device 22 generates advice information, based on the detection result of odor substances detected by the odor sensor 21 and displays the advice information (step S6). The information processing device 22 identifies an odor of the gas, based on a pattern of a plurality of odor substances detected by the odor sensor 21, generates advice information, based on the identified odor, and displays the generated advice information. Note that, as the advice information, the information processing device 22 may only display the type and intensity of halitosis.

Note that, for the mouth cavity attachment tool 1A according to the present embodiment, the whole of the tooth rows 2 was set as an object of measurement. However, the present disclosure is not limited to the configuration. A portion of the tooth rows 2 may be set as an object of measurement.

Embodiment 2

Next, Embodiment 2 of the present disclosure is described.

Figure 6:
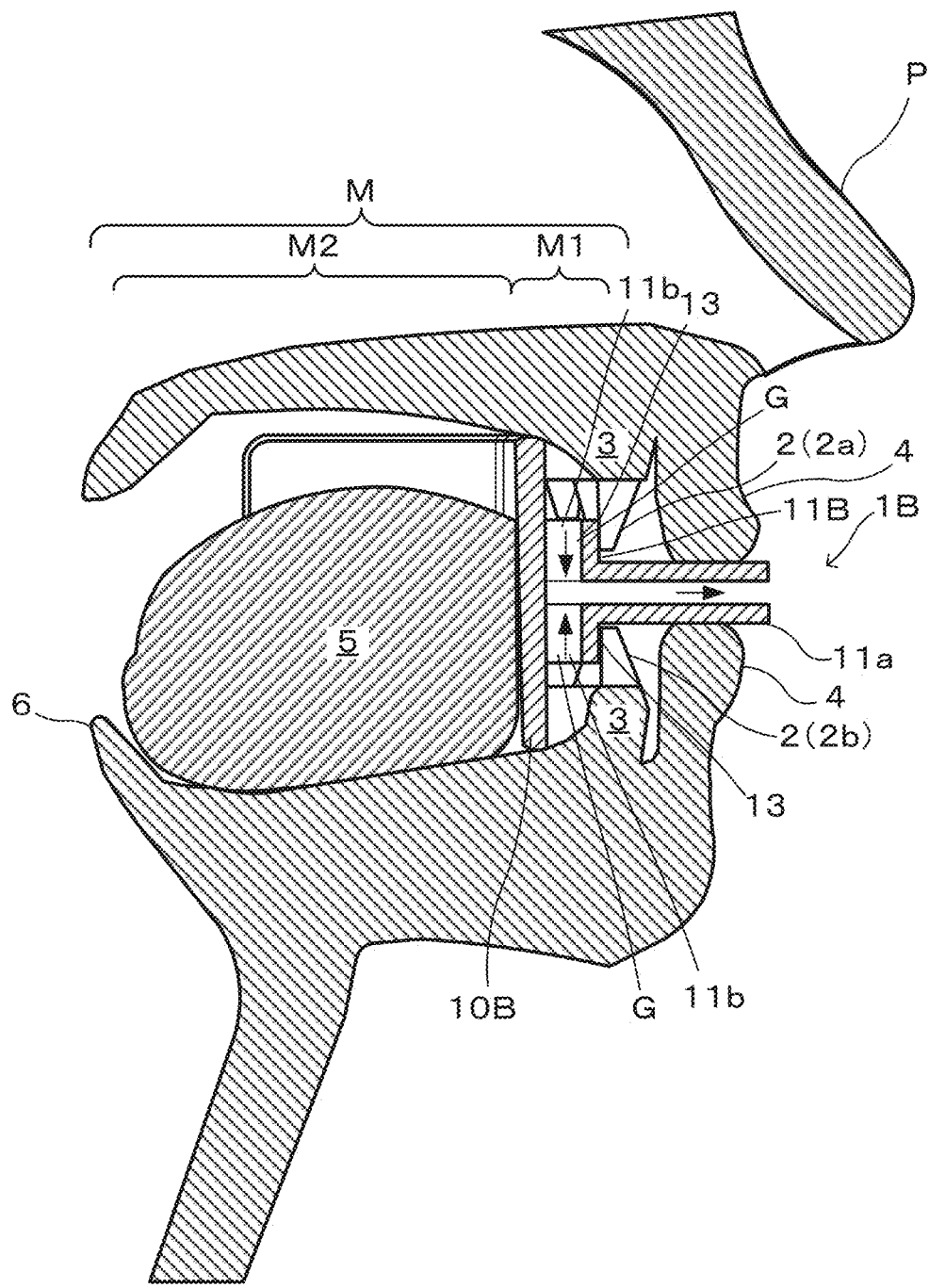
FIG. 6 is a cross-sectional view along a sagittal plane illustrating an appearance in which a mouth cavity attachment tool according to Embodiment 2 of the present disclosure is attached to the mouth cavity of a person under examination.

As illustrated in FIG. 6, for a mouth cavity attachment tool 1B according to Embodiment 2, not the front sides but the back sides of tooth rows 2 and gums 3 of a person P under examination are set as objects of measurement. In the present embodiment, the objects of measurement include boundary portions between the back sides of the tooth rows 2 and the back sides of the gums 3.

Figure 7A:
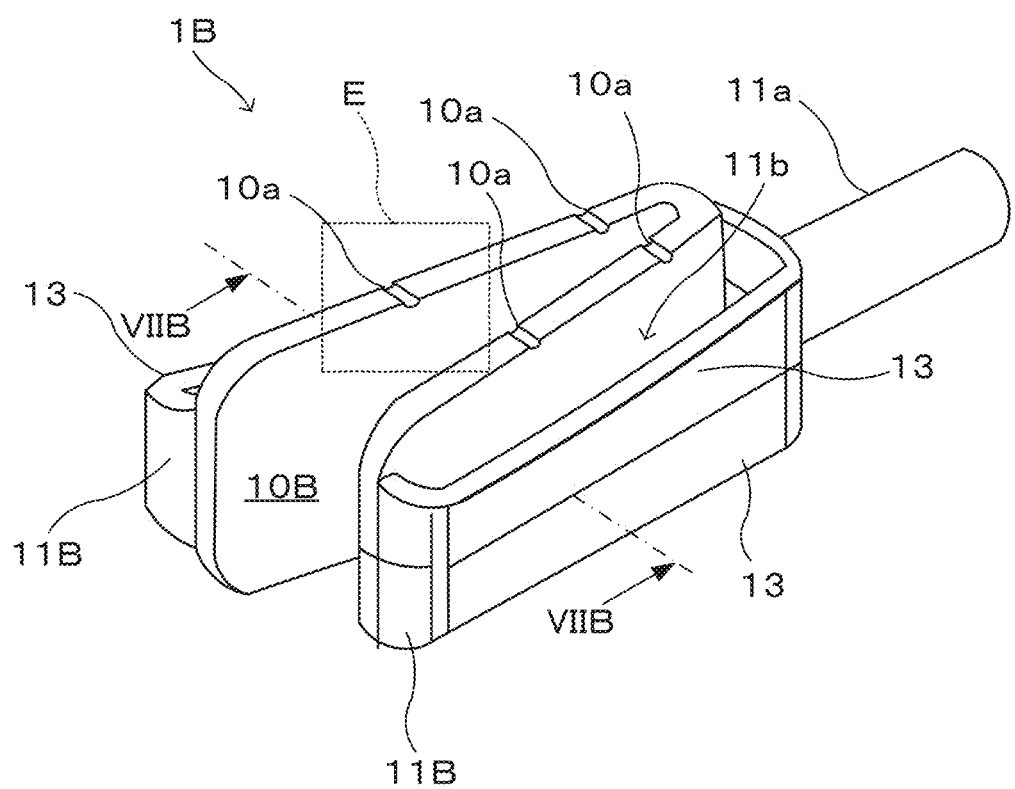
FIG. 7A is a perspective view of the mouth cavity attachment tool in FIG. 6.

As illustrated in FIG. 7A, the mouth cavity attachment tool 1B according to the present embodiment is of a mouthpiece type and is U-shaped or V-shaped in conformance with a tooth shape of the person P under examination as a whole. The mouth cavity attachment tool 1B according to the present embodiment includes a partitioning portion 10B and a gap forming portion 11B. The mouth cavity attachment tool 1B is, as with the above-described Embodiment 1, formed of an elastic member.

Figure 7B:
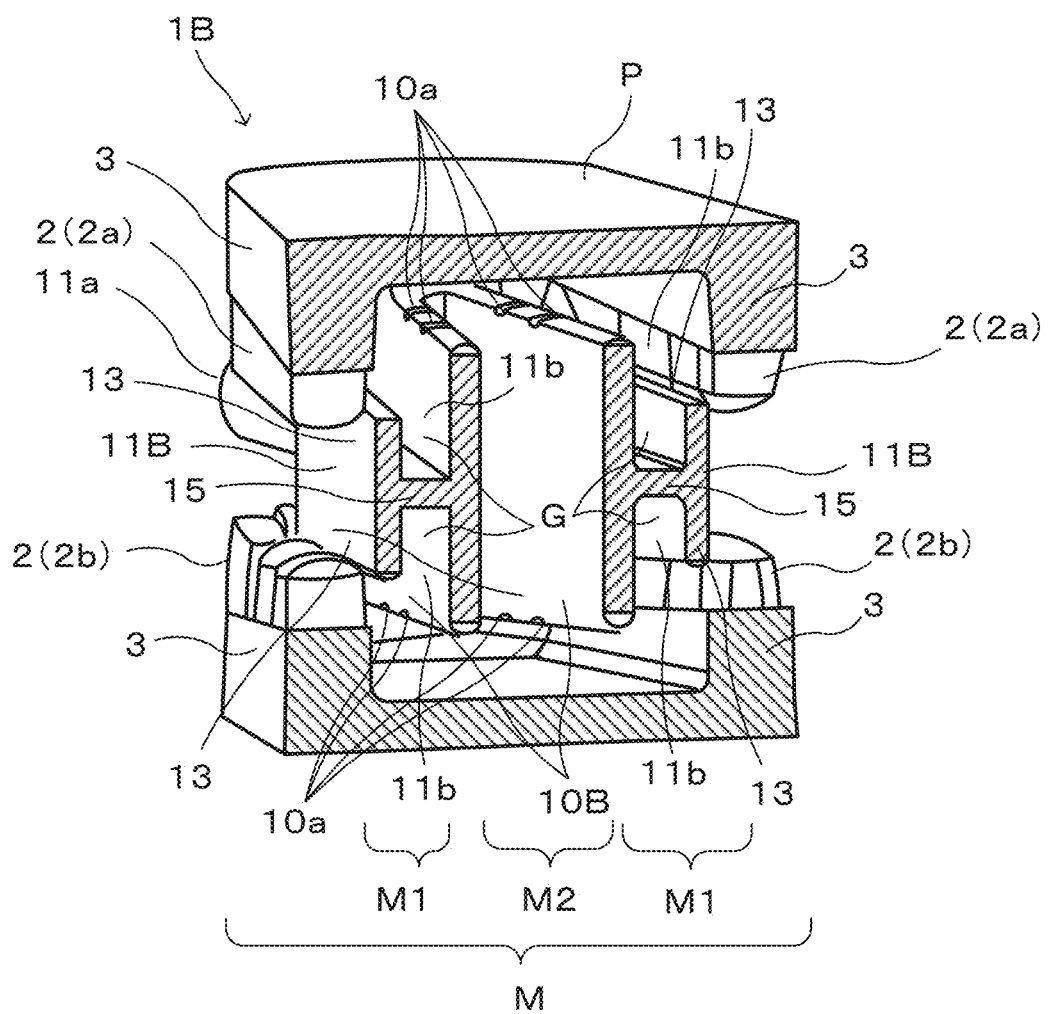
FIG. 7B is a cross-sectional perspective view taken along the line VIIB-VIIB of FIG. 7A in the case where the mouth cavity attachment tool in FIG. 7A is attached to the mouth cavity.

As illustrated in FIG. 7B, the partitioning portion 10B and the gap forming portion 11B bend along the back sides of the tooth rows 2 and the gums 3. In the present embodiment, the partitioning portion 10B is arranged at a uniform distance from the tooth rows 2 and the gums 3, and, between the partitioning portion 10B and the tooth rows 2 and gums 3, the gap forming portion 11B is arranged.

As illustrated in FIG. 6, the partitioning portion 10B partitions a mouth cavity M into a first portion M1 in which the tooth rows 2 and the gums 3, which are objects of measurement of halitosis, are located and a second portion M2 that communicates with a pharynx 6 of the person P under examination. As illustrated in FIG. 7A, the gap forming portion 11B is connected to the partitioning portion 10B. The gap forming portion 11B forms, in conjunction with the partitioning portion 10B, gaps G to which boundary portions between the back sides of the tooth rows 2 and the back sides of the gums 3 are respectively exposed.

More specifically, as illustrated in FIG. 7B, the gap forming portion 11B includes a projecting portion 15 and a wall portion 13. The projecting portion 15 projects from the partitioning portion 10B toward the tooth rows 2 and the gums 3, and the wall portion 13 is arranged along portions of the tooth rows 2, that is, an upper tooth row 2a and a lower tooth row 2b, with the projecting portion 15 interposed between the wall portion 13 and the partitioning portion 10B in such a manner as to face the partitioning portion 10B.

The projecting portion 15 and the wall portion 13 form recessed portions 11b. By the recessed portions 11b, the gaps G are respectively formed between the mouth cavity attachment tool 1B and the boundary portions between the back sides of the tooth rows 2 and the back sides of the gums 3. To the gap forming portion 11B, a discharge pipe 11a is disposed to take out gases in contact with the tooth rows 2 and the gums 3 to the outside of the mouth cavity M. Gases existing in the gaps G are in contact with the boundary portions between the tooth rows 2 and the gums 3. The gases in the gaps G in contact with the tooth rows 2 and the gums 3 are discharged to the outside of the mouth cavity M through the discharge pipe 11a as a sample containing odor substances that are components of halitosis.

Figure 7C:
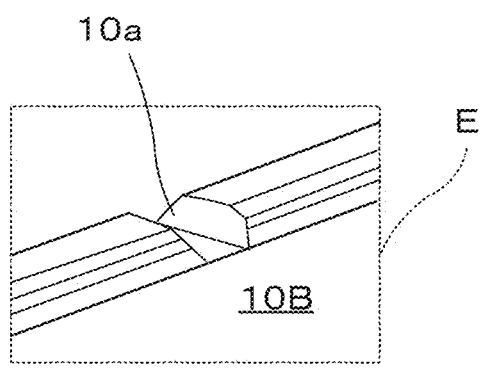
FIG. 7C is an enlarged view of a part E in FIG. 7A.

On the partitioning portion 10B, groove portions 10a that serve as feed portions are formed. As illustrated in FIG. 7C, the groove portions 10a communicate the gaps G formed by the recessed portions 11b with the outside (in the present embodiment, the second portion M2). Note that, although, in FIG. 7B, the edges of the partitioning portion 10B on which the groove portions 10a are formed are not in contact with the hard palate and the like in the mouth cavity M, the edges are in contact with the hard palate and the like while the mouth is closed. When gases existing in the gaps G are discharged via the discharge pipe 11a, gas in the second portion M2 is fed into the recessed portions 11b via the groove portions 10a and rapid decompression in the gaps G is thereby prevented. The flow of the gas on that occasion is smaller than the flow of gas due to exhaled air at the time when the partitioning portion 10B does not exist.

A flow of measurement of halitosis using the halitosis measurement system 100 according to the present embodiment is the same as the flow using the halitosis measurement system 100 according to the above-described Embodiment 1 illustrated in FIG. 4. When the pump 20 is activated, gases are discharged from the gaps G of the mouth cavity attachment tool 1B via the discharge pipe 11a and are discharged from a nozzle 20a, as illustrated by arrows in FIG. 6. An odor sensor 21 detects an odor substance contained in the gas discharged from the nozzle 20a. An information processing device 22 identifies an odor of the gas, based on a pattern of a plurality of odor substances detected by the odor sensor 21, generates advice information, based on the identified odor, and outputs the generated advice information.

Note that, for the mouth cavity attachment tool 1B according to the present embodiment, the whole of the tooth rows 2 is set as an object of measurement. However, the present disclosure is not limited to the configuration. A portion of the tooth rows 2 may be set as an object of measurement.

Embodiment 3

Next, Embodiment 3 of the present disclosure is described.

The mouth cavity attachment tools 1A and 1B according to the above-described Embodiments 1 and 2 were mouth cavity attachment tools of the mouthpiece type that were formed in shapes in conformance with the tooth rows 2 and the gums 3 of the person P under examination. However, since the shapes of the tooth rows 2 and the gums 3 differ variously depending on a person P under examination, the mouth cavity attachment tools 1A and 1B according to the above-described embodiments are required to be produced with respect to each person P under examination. Thus, a mouth cavity attachment tool 1C according to the present embodiment is formed in a rectangular parallelepiped shape as a whole in such a way as to be able to be used in a shared manner among persons P under examination, as illustrated in FIG. 8A, FIG. 8B, FIG. 9A, and FIG. 9B.

For the mouth cavity attachment tool 1C according to the present embodiment, both the front sides and the back sides of tooth rows 2 and gums 3 of a person P under examination are set as objects of measurement.

The mouth cavity attachment tool 1C is, as with the above-described Embodiments 1 and 2, formed of an elastic member. As such an elastic member, for example, urethane rubber or silicone rubber can be used, as described afore.

Figure 8A:
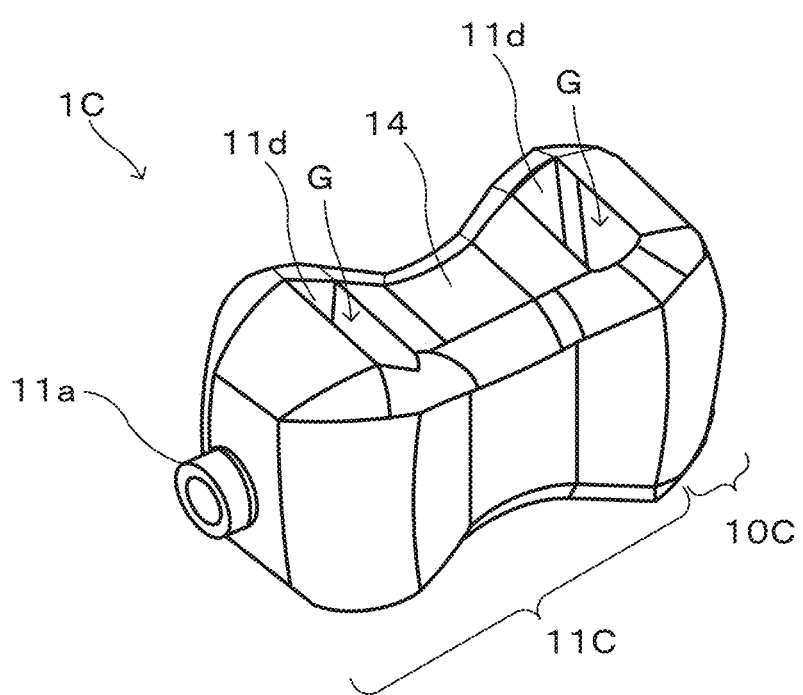
FIG. 8A is a perspective view of a mouth cavity attachment tool according to Embodiment 3 of the present disclosure.
Figure 10:
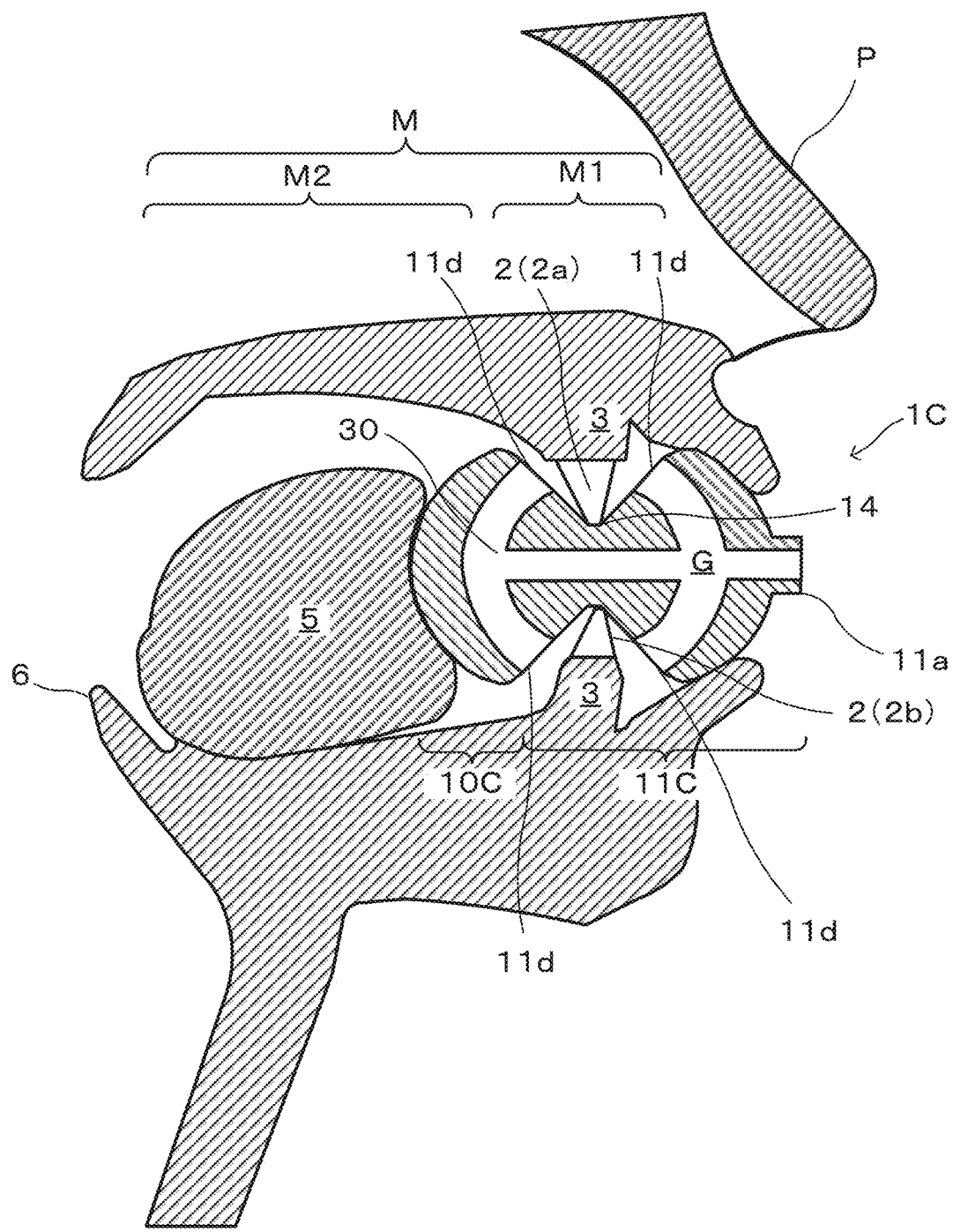
FIG. 10 is a cross-sectional view along a sagittal plane illustrating an appearance in which the mouth cavity attachment tool according to Embodiment 3 of the present disclosure is attached to the mouth cavity of the person under examination.

A more detailed configuration of the mouth cavity attachment tool 1C is described. As illustrated in FIG. 8A and FIG. 10, the mouth cavity attachment tool 1C includes a partitioning portion 10C and a gap forming portion 11C. As illustrated in FIG. 10, the partitioning portion 10C partitions a mouth cavity M into a first portion M1 in which objects of measurement of halitosis are located and a second portion M2 that communicates with a pharynx 6 of the person P under examination. Although, since the partitioning portion 10C is not formed to fit the shape of the mouth cavity M of the person P under examination, the first portion M1 is not completely shielded from the second portion M2, existence of the partitioning portion 10C enables gaps to be narrowed between the first portion M1 and the second portion M2 and air flow between the first portion M1 and the second portion M2 to be thereby suppressed.

The mouth cavity attachment tool 1C according to the present embodiment includes a discharge pipe 11a and an internal flow path 30 to discharge gases in contact with the tooth rows 2 and the gums 3 from gaps G to the outside of the mouth cavity M. The internal flow path 30 includes opening portions 11d. Four opening portions 11d are formed, and the four opening portions 11d are respectively formed in such a manner as to face the front side and the back side of an upper tooth row 2a and gum 3 and the front side and the back side of a lower tooth row 2b and gum 3.

The internal flow path 30 causes the gaps G to be formed between the mouth cavity attachment tool 1C and the tooth rows 2 and gums 3, which are the objects of measurement. In addition, the internal flow path 30 communicates with the discharge pipe 11a. Therefore, gases that have been in contact with the tooth rows 2 and the gums 3 flow into the internal flow path 30 through the gaps G and are further discharged from the discharge pipe 11a.

Figure 8B:
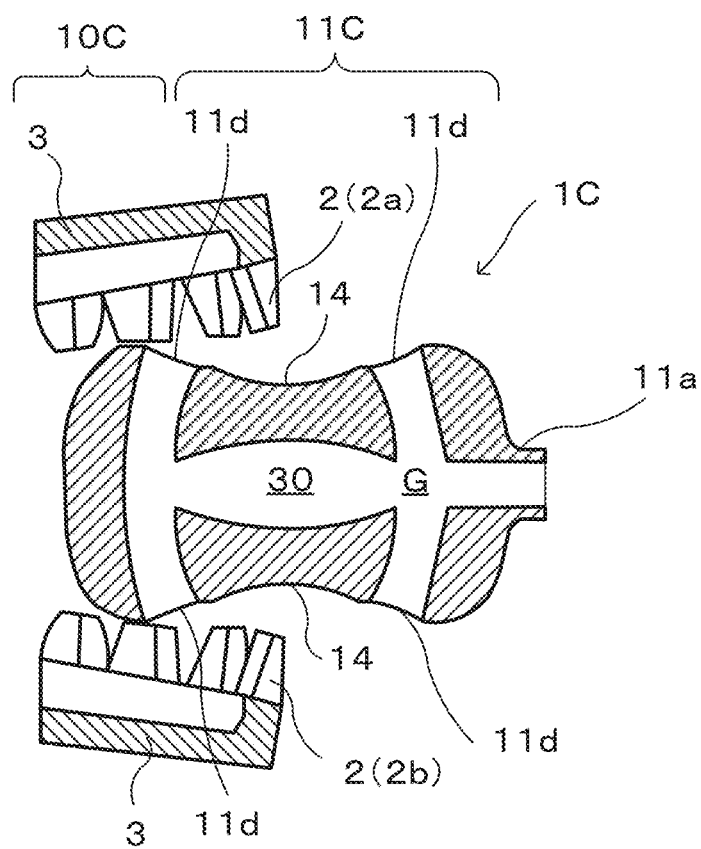
FIG. 8B is a cross-sectional view in the case where the mouth cavity attachment tool in FIG. 8A is attached to the mouth cavity.
Figure 9A:
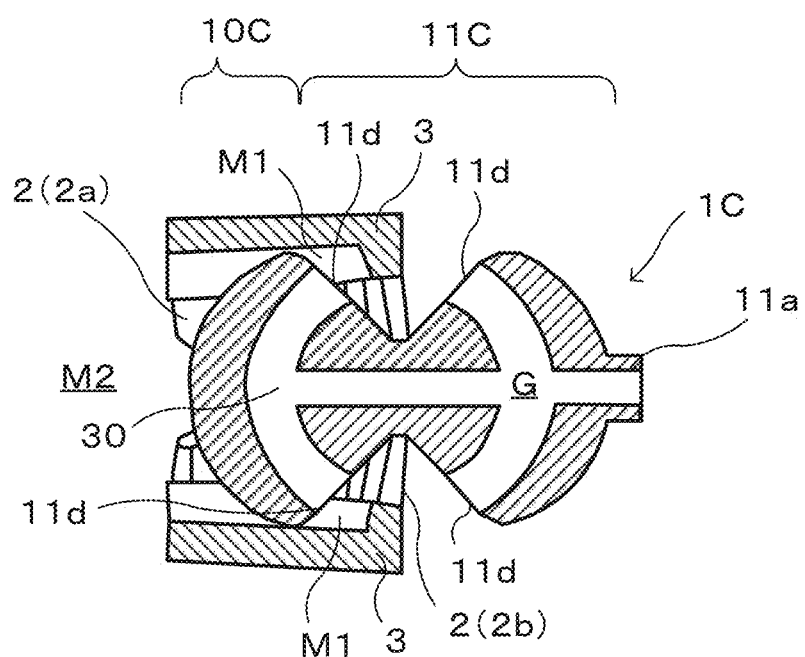
FIG. 9A is a cross-sectional view of the mouth cavity attachment tool in FIG. 8A while the mouth cavity attachment tool is bitten by a person under examination.
Figure 9B:
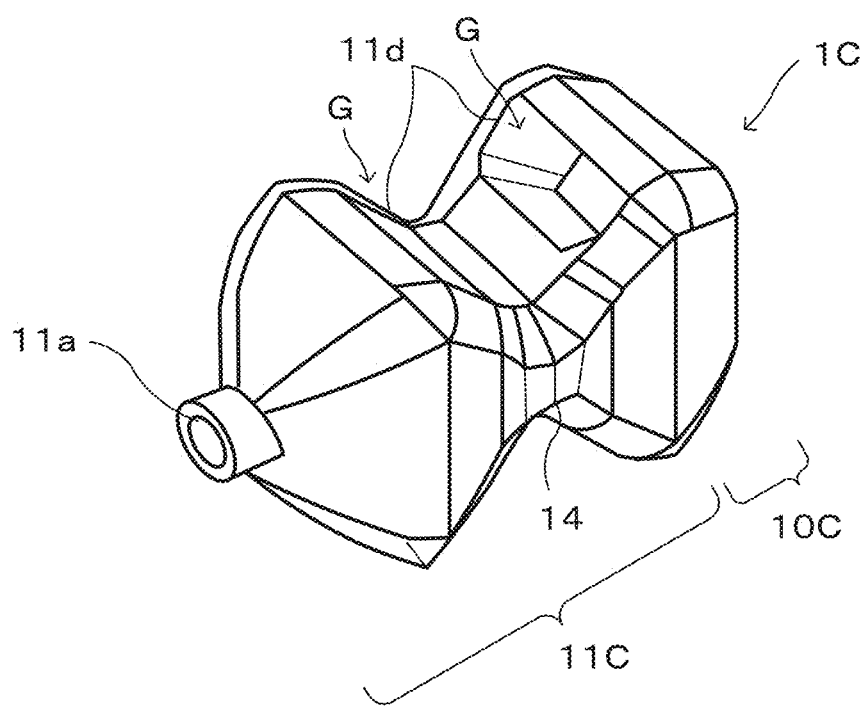
FIG. 9B is a perspective view of the mouth cavity attachment tool while the mouth cavity attachment tool is in a state in FIG. 9A.

The mouth cavity attachment tool 1C has a middle portion in the longitudinal direction (direction pointing from the pharynx 6 to lips 4) thereof constricted. The constricted portion of the mouth cavity attachment tool 1C is a clamped portion 14 that the person P under examination clamps with the upper tooth row 2a and the lower tooth row 2b. When the mouth cavity attachment tool 1C is used, the person P under examination bites the clamped portion 14, as illustrated in FIG. 8B. When the clamped portion 14 is bitten by the upper tooth row 2a and the lower tooth row 2b of the person P under examination, the clamped portion 14 is distorted into a flat shape, and the entire mouth cavity attachment tool 1C deforms as illustrated in FIG. 9A and FIG. 9B.

As illustrated in FIG. 10, when the mouth cavity attachment tool 1C deforms, the opening portions 11d of the internal flow path 30 come closer to the tooth rows 2 and the gums 3, which are the objects of measurement. In addition, as illustrated in FIG. 8B, the internal flow path 30 has a larger cross section at a portion corresponding to the clamped portion 14 than that at the other portions in such a way that the internal flow path 30 is not closed as illustrated in FIG. 9A even while the mouth cavity attachment tool 1C is bitten by the person P under examination.

Operation of a halitosis measurement system 100 according to the present embodiment is described. As illustrated in FIG. 10, gases that have been in contact with the front sides and the back sides of the upper tooth row 2a, the lower tooth row 2b, and the gums 3 are captured into the internal flow path 30 from the opening portions 11d corresponding to respective ones thereof and are discharged from the discharge pipe 11a, as illustrated in FIG. 4. The gas discharged from the discharge pipe 11a is discharged from a nozzle 20a, and an odor substance causing halitosis is detected by an odor sensor 21. An information processing device 22 identifies an odor of the gas, based on a pattern of a plurality of odor substances detected by the odor sensor 21, generates advice information, based on the identified odor, and outputs the generated advice information.

Figure 11:
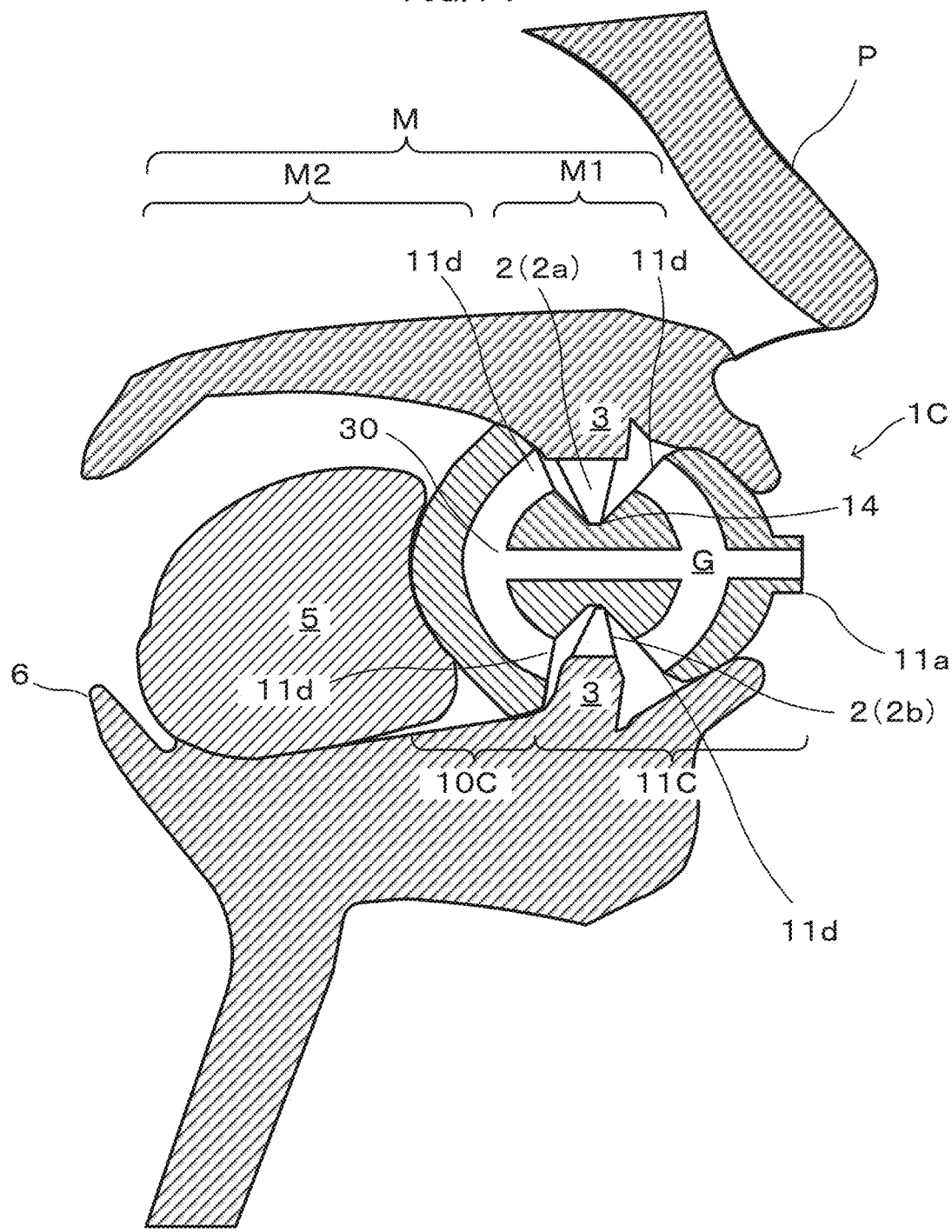
FIG. 11 is a diagram illustrating a variation of the mouth cavity attachment tool in FIG. 10.

Note that the mouth cavity attachment tool 1C may have a shape as illustrated in FIG. 11. As illustrated in FIG. 11, in the mouth cavity attachment tool 1C, the partitioning portion 10C is formed to have a larger width vertically and horizontally than the mouth cavity attachment tool 1C illustrated in FIG. 10. When configured in such a manner, it becomes possible to suppress air flow between the first portion M1 and the second portion M2 more surely.

In addition, although the mouth cavity attachment tool 1C is formed in a rectangular parallelepiped shape, the present disclosure is not limited to the configuration. For example, the mouth cavity attachment tool 1C may be formed in a spherical shape, an ellipsoidal shape, or a shape like a rugby ball.

As described in detail in the foregoing, according to the mouth cavity attachment tools 1A, 1B, and 1C according to the above-described embodiments, since the mouth cavity attachment tools 1A, 1B, and 1C include the partitioning portions 10A, 10B, and 10C that partition the mouth cavity M into the first portion M1 in which the tooth rows 2 and the gums 3 are located and the second portion M2 that communicates with the pharynx 6 of the person P under examination, respectively, it is possible to improve detection precision of halitosis originating in the mouth cavity M.

More specifically, according to the mouth cavity attachment tools 1A, 1B, and 1C, the partitioning portions 10A, 10B, and 10C enable gas flow due to exhaled air that comes into contact with the tooth rows 2 and the gums 3 to be suppressed. Since this capability enables concentration of odor substances emitted from the tooth rows 2 and the gums 3 to be prevented from being reduced, it is possible to improve detection precision of halitosis originating in the mouth cavity M.

According to the mouth cavity attachment tools 1A to 1C according to the above-described embodiments, it is possible to detect odor substances originating in the mouth cavity M. Therefore, it becomes possible to determine whether halitosis originates in the mouth cavity M or originates from the other causes.

In addition, according to the above-described embodiment, the mouth cavity attachment tool 1C is inserted between the tooth rows 2 and gums 3 and the lips 4 and between the tooth rows 2 and gums 3 and the tongue 5 and forms the gaps G for the tooth rows 2 and the gums 3. As described above, when the gaps G are formed in such a way that gas easily comes into contact with the tooth rows 2 and the gums 3, odor substances causing halitosis can be excellently collected from the tooth rows 2 and the gums 3.

In addition, the mouth cavity attachment tools 1A and 1B according to the above-described Embodiments 1 and 2 was of the mouthpiece type. While it is required to use a mouth cavity attachment tool of the mouthpiece type that fits the shapes of the tooth rows 2 and the gums 3 of an individual person P under examination, a mouth cavity attachment tool of the mouthpiece type is capable of maintaining high airtightness in the gaps G and detecting odor substances at high concentration. On the other hand, the mouth cavity attachment tool 1C according to the above-described Embodiment 3 is of a cuboid-shaped block type, and, while the airtightness of spaces partitioned by the partitioning portion 10C deteriorates, it becomes unnecessary to produce a mouth cavity attachment tool 1C for each person P under examination.

The gaps G as described above may be configured to be formed by recessed portions as the gap forming portions 11A and 11B or formed by the internal flow path 30 having the opening portions 11d facing the tooth rows 2 and the gums 3 as the gap forming portion 11C.

In addition, for the mouth cavity attachment tool 1A according to the above-described Embodiment 1, the front sides of the tooth rows 2 and gums 3 were set as objects of measurement, and, for the mouth cavity attachment tool 1B according to the above-described Embodiment 2, the back sides of the tooth rows 2 and gums 3 were set as objects of measurement. However, the present disclosure is not limited to the configuration. By combining the mouth cavity attachment tool 1A and the mouth cavity attachment tool 1B, a mouth cavity attachment tool that is capable of measuring both the front sides and the back sides of the tooth rows 2 and gums 3 may be used.

In addition, in the mouth cavity attachment tools 1A, 1B, and 1C according to the above-described embodiments, when gases in the gaps G are discharged via the discharge pipe 11a, decompression in the gaps G is prevented by forming the groove portions 11c or 10a that communicate the gaps G with another portion of the mouth cavity M.

In addition, the mouth cavity attachment tool 1C is formed of an elastic member and, in the case of having the internal flow path 30 through which gas passes, is formed in such a way as not to close the internal flow path 30. This configuration enables gases that have been in contact with the tooth rows 2 and the gums 3 to be surely taken out from the discharge pipe 11a.

Note that, in the above-described embodiment, the internal flow path 30 in the clamped portion 14, which is to be bitten by the person P under examination, is formed to have a large cross section lest the internal flow path 30 be closed while the clamped portion 14 is bitten by the person P under examination. However, the present disclosure is not limited to the configuration. The hardness of a member forming the internal flow path 30 in a portion to be bitten by the person P under examination may be changed to a hardness that does not allow human occlusal force to close the internal flow path 30. For example, the inner wall of the internal flow path 30 may be formed of a metallic material.

Figure 12:
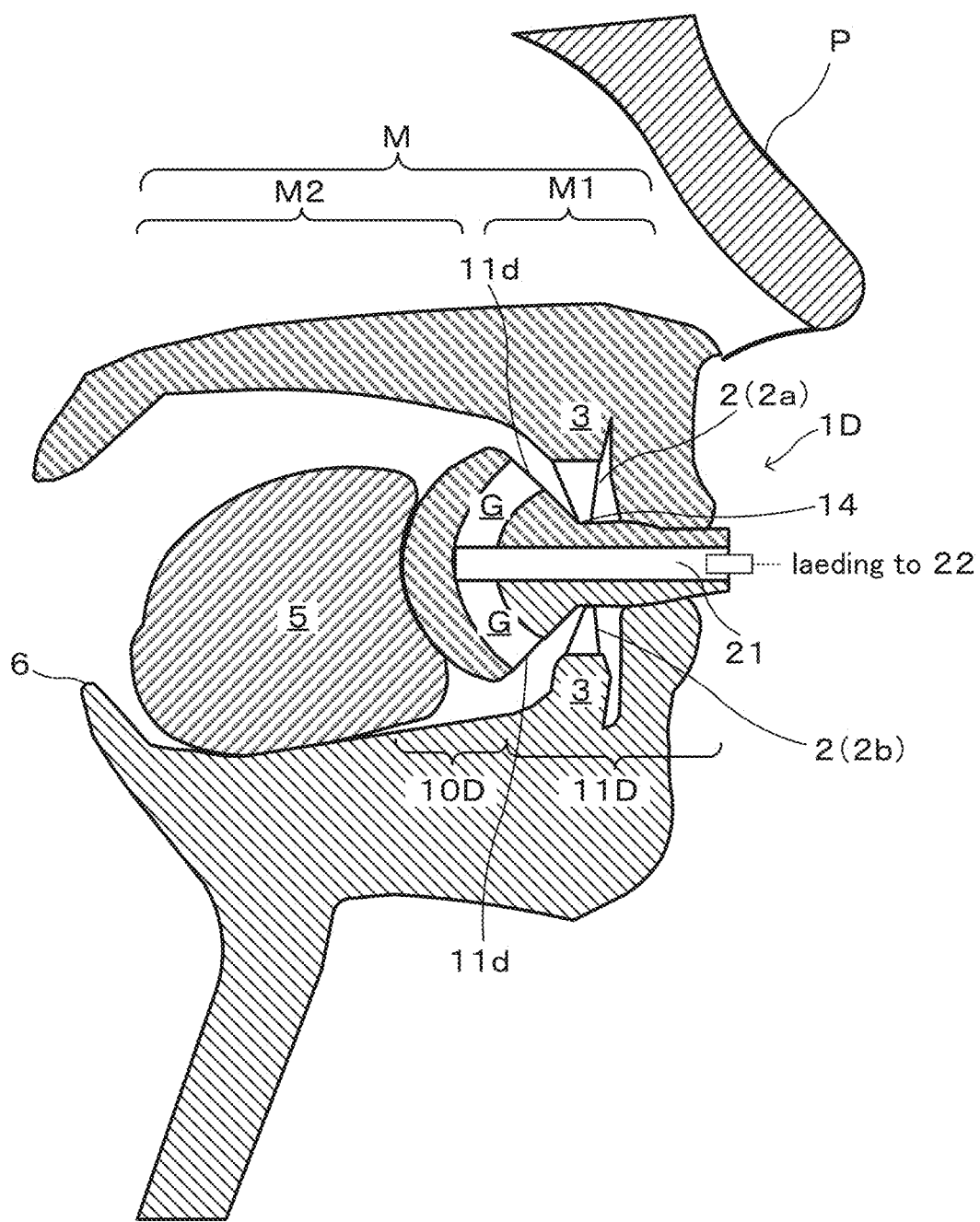
FIG. 12 is a cross-sectional view along a sagittal plane illustrating an appearance in which a mouth cavity attachment tool in which an odor sensor is incorporated is attached to the mouth cavity of a person under examination.

In addition, in the above-described Embodiment 3, it was assumed that the odor sensor 21 was installed outside the mouth cavity M of the person P under examination. However, it may be configured such that, as illustrated in FIG. 12, an odor sensor 21 is installed inside a mouth cavity attachment tool 1D. The mouth cavity attachment tool 1D includes a partitioning portion 10D and a gap forming portion 11D. The partitioning portion 10D is the same as the partitioning portion 10C according to the above-described Embodiment 3. The gap forming portion 11D has opening portions 11d one of which opens to a surface facing the back side of the upper tooth row 2a and gum 3 and the other of which opens to a surface facing the back side of the lower tooth row 2b and gum 3. Gas that has been in contact with the back side of the upper tooth row 2a and gum 3 or the back side of the lower tooth row 2b and gum 3 enters an internal flow path 30 from one of the opening portions 11d. The odor sensor 21 detects odor substances contained in the gas that has entered the internal flow path 30. A detection result by the odor sensor 21 is sent to an information processing device 22.

In this case, the odor sensor 21 that is produced using a micro electro mechanical systems (MEMS) technology can be used.

Note that, inside the mouth cavity attachment tool 1D illustrated in FIG. 12, a pump 20 may be installed in conjunction with the odor sensor 21. As the pump 20, a pump that is produced using the MEMS technology can also be used.

Figure 13:
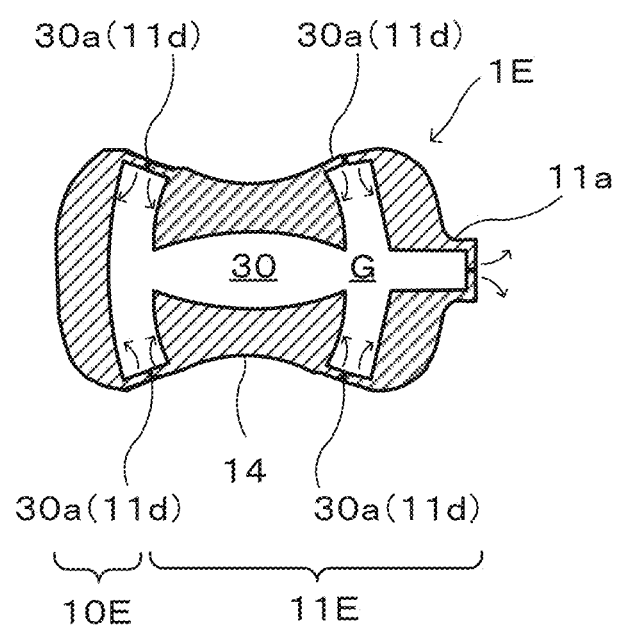
FIG. 13 is a cross-sectional view illustrating an example of a mouth cavity attachment tool configured to be capable of sealing gaps when the mouth cavity attachment tool is taken out from the mouth cavity.

In addition, as in a mouth cavity attachment tool 1E illustrated in FIG. 13, a gap forming portion 11E may be configured to be capable of closing gaps G when the mouth cavity attachment tool 1E is taken out from the mouth cavity M. In the mouth cavity attachment tool 1E illustrated in FIG. 13, a partitioning portion 10E and the gap forming portion 11E are formed, and, at opening portions 11d of an internal flow path 30 in the gap forming portion 11E, valve portions 30a are respectively formed. The valve portions 30a are configured to open while gas in the internal flow path 30 is sucked by a pump 20 and close the opening portions 11d when the suction by the pump 20 is suspended. When configured in such a manner, it becomes possible to, for example, collect gas or saliva of a person P under examination in the internal flow path 30 and detect odor substances emitted from the collected gas or saliva later. Note that it may be configured to close the internal flow path 30, using, in place of the valve portions 30a, lids that close the opening portions 11d.

Note that the mouth cavity attachment tool 1A according to the above-described Embodiment 1 or the mouth cavity attachment tool 1B according to the above-described Embodiment 2 may also be configured to be capable of sealing the gaps G when the mouth cavity attachment tool 1A or the mouth cavity attachment tool 1B is removed from the mouth cavity M.

Figure 14A:
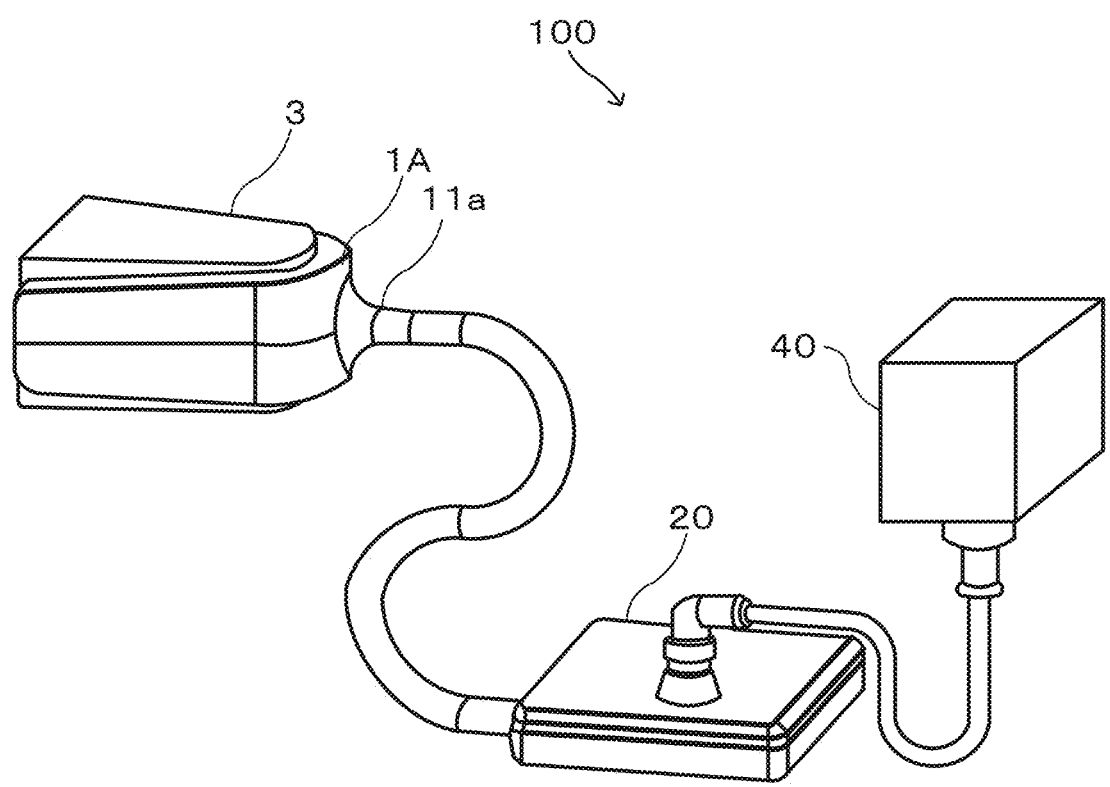
FIG. 14A is a diagram illustrating a first variation of the halitosis measurement system.
Figure 14B:
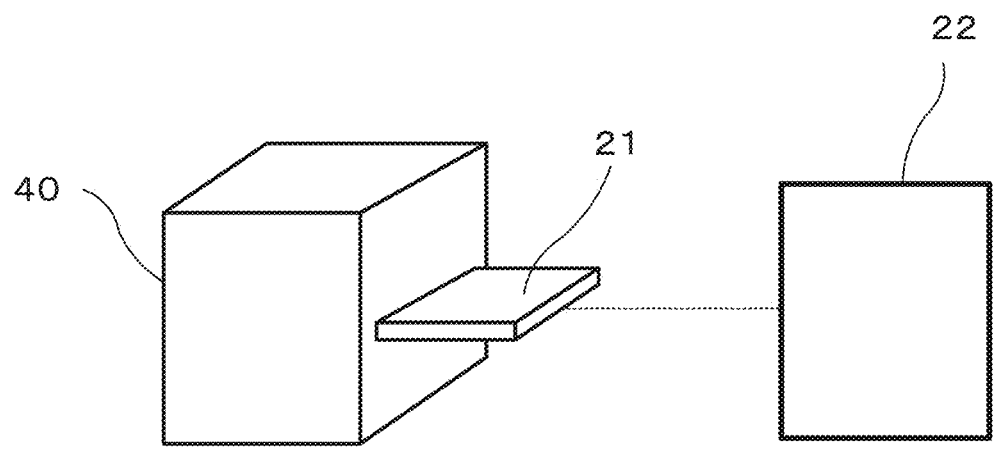
FIG. 14B is a diagram illustrating a second variation of the halitosis measurement system.

In addition, as illustrated in FIG. 14A, the halitosis measurement system 100 may include a collector 40 that collects gases that have been in contact with the tooth rows 2 and the gums 3 from the mouth cavity attachment tool 1A. After gases are collected in the collector 40 by the halitosis measurement system 100 illustrated in FIG. 14A, an odor sensor 21 is set to the collector 40 removed from the pump 20 and the like, as illustrated in FIG. 14B and odor substances that are components of halitosis can be detected based on the gases collected in the collector 40.

Note that, in the above-described embodiments, both the upper tooth row 2a and the lower tooth row 2b were set as objects of measurement of halitosis. However, the present disclosure is not limited to the configuration. Either the upper tooth row 2a or the lower tooth row 2b may be set as an object of measurement of halitosis.

Note that, in the above-described embodiments, a case where regions including the boundary portions between the tooth rows 2 and the gums 3 were set as objects of measurement was described. However, the present disclosure is not limited to the configuration. It may be configured such that another place in the mouth cavity M, such as the tongue 5, is set as an object of measurement.

Note that, in the above-described embodiments, a case where a human being was set as a person P under examination was described. However, the present disclosure is not limited to the configuration. An animal other than a human being can be set as a person P under examination. In particular, the mouth cavity attachment tool and the halitosis measurement system according to the present disclosure are suitable for a mammal, such as a dog and a cat. Note, however, that application to an animal other than a mammal is not excluded.

Note that, in the above-described embodiments, gases that have been in contact with the tooth rows 2 and the gums 3 are taken out without distinction via one discharge pipe 11a and odor thereof is measured. However, the present disclosure is not limited to the configuration. It may be configured such that, by taking out gases separately depending on a region serving as an object of measurement, such as separating the discharge pipe 11a into a discharge pipe for the upper tooth row 2a and a discharge pipe for the lower tooth row 2b, odors are individually measured. In addition, it may be configured to, by separating the internal flow path 30 and the discharge pipe 11a into flow paths and pipes each of which correspond to one of the four opening portions 11d of the mouth cavity attachment tool 1C, separately detect odor substances. When configured in such a manner, it becomes possible to identify a region in the mouth cavity M causing halitosis more finely.

The shapes of the mouth cavity attachment tools 1A to 1E are not limited to the shapes according to the above-described Embodiments 1 to 3. For example, a mouth cavity attachment tool that is formed by further flattening the mouth cavity attachment tool 1C according to the above-described Embodiment 3 may be used. In addition, the mouth cavity attachment tools may be configured to have a wide internal space as an internal flow path.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2020-130580, filed on Jul. 31, 2020, the entire disclosure of which is incorporated by reference herein.

INDUSTRIAL APPLICABILITY

The present disclosure is applicable to detection of halitosis originating in the mouth cavity.

1A, 1B, 1C, 1D, 1E Mouth cavity attachment tool
2 Tooth row
2a Upper tooth row
2b Lower tooth row
3 Gum
4 Lip
5 Tongue
6 Pharynx
10A, 10B, 10C, 10D, 10E Partitioning portion
10a Groove portion
11A, 11B, 11C, 11D, 11E Gap forming portion
11a Discharge pipe
11b Recessed portion
11c Groove portion
11d Opening portion
12 Clamped portion
13 Wall portion
14 Clamped portion
15 Projecting portion
20 Pump
20a Nozzle
21 Odor sensor
22 Information processing device
30 Internal flow path
30a Valve portion
40 Collector
100 Halitosis measurement system
G Gap
M Mouth cavity
M1 First portion
M2 Second portion
P Person under examination

What is claimed is:

1. A mouth cavity attachment tool, the mouth cavity attachment tool being attachable to a mouth cavity of a person under examination, the mouth cavity attachment tool comprising:
   a partitioning portion to partition the mouth cavity into a
      portion in which an object of measurement of halitosis is located and a portion communicating with a pharynx of the person under examination; and a gap forming portion connected to the partitioning portion and configured to form a gap between the mouth cavity attachment tool and the object of measurement;

wherein the gap forming portion is configured to be capable of sealing the gap when the mouth cavity attachment tool is taken out from the mouth cavity.

2. The mouth cavity attachment tool according to claim 1, wherein the gap forming portion forms the gap by entering between the object of measurement and a region in the mouth cavity coming into contact with the object of measurement.

3. The mouth cavity attachment tool according to claim 1, wherein, on the gap forming portion, a recessed portion forming the gap is formed.

4. The mouth cavity attachment tool according to claim 3 comprising:

a discharge pipe to discharge gas in contact with the object of measurement from the gap to an outside of the mouth cavity; and a feed portion to feed gas in the mouth cavity into the gap.

5. The mouth cavity attachment tool according to claim 1, further comprising:

a discharge pipe to discharge gas in contact with the object of measurement from the gap to an outside of the mouth cavity; and an internal flow path opening opposite to the object of measurement and forming the gap and also communicating with the discharge pipe.

6. The mouth cavity attachment tool according to claim 5, wherein the mouth cavity attachment tool is formed of an elastic member, and is formed in such a way as not to close the internal flow path while the mouth cavity attachment tool is bitten by the person under examination.

7. The mouth cavity attachment tool according to claim 1, wherein the object of measurement includes at least one of a front side and a back side of a tooth row and a gum of the person under examination.

8. The mouth cavity attachment tool according to claim 7, wherein the object of measurement includes a boundary portion between the tooth row and the gum.

9. A halitosis measurement system comprising:

the mouth cavity attachment tool according to claim 1; and an odor sensor to detect an odor substance, the odor substance being a component of halitosis, based on gas having been in contact with an object of measurement in the mouth cavity attachment tool.

10. The halitosis measurement system according to claim 9, further comprising:

a pump to suck gas having been in contact with the object of measurement from the mouth cavity attachment tool and send the gas to the odor sensor.

11. The halitosis measurement system according to claim 9, wherein the odor sensor is installed inside the mouth cavity attachment tool.

12. The halitosis measurement system according to claim 10, wherein the pump and the odor sensor are installed inside the mouth cavity attachment tool.

13. The halitosis measurement system according to claim 10, wherein the pump and the odor sensor are installed outside the mouth cavity.

14. A halitosis measurement system comprising:

the mouth cavity attachment tool according to claim 1;

a pump to suck gas having been in contact with an object of measurement from the mouth cavity attachment tool;

a collector to collect gas sucked by the pump; and an odor sensor to detect an odor substance, the odor substance being a component of halitosis, based on gas collected by the collector.

15. The halitosis measurement system according to claim 9, further comprising an information generator to generate advice information for the person under examination, based on an odor substance detected by the odor sensor.

* * * * *